United States Patent

Barzana et al.

[11] 4,305,074
[45] Dec. 8, 1981

[54] ELECTROMAGNETIC DETECTION APPARATUS

[75] Inventors: Luis C. Barzana, Burlington, Mass.; Dennis A. Green, Vero Beach; David R. Wakeman, Clearwater, both of Fla.

[73] Assignee: The United States of America as represented by the Secretary of the Army, Washington, D.C.

[21] Appl. No.: 148,890

[22] Filed: May 12, 1980

[51] Int. Cl.³ .............................................. G01S 3/48
[52] U.S. Cl. .................................. 343/7 A; 343/16 R; 343/113 R
[58] Field of Search ........... 343/7 A, 10, 16 R, 113 R

[56] References Cited

U.S. PATENT DOCUMENTS

| 3,172,075 | 3/1965 | Kay ..................................... 343/10 X |
| 3,296,578 | 1/1967 | Saxton et al. .................. 343/16 R X |
| 3,408,649 | 10/1968 | Keller ............................ 343/16 R X |
| 3,540,054 | 11/1970 | Broderick ..................... 343/16 R X |
| 3,924,236 | 12/1975 | Earp et al. ......................... 343/16 R |

Primary Examiner—T. H. Tubbesing
Attorney, Agent, or Firm—Nathan Edelberg; Robert P. Gibson; Max Yarmovsky

[57] ABSTRACT

An electromagnetic detection apparatus for sensing an object, has a transmitter for radiating electromagnetic energy toward the object. The apparatus also has an array of at least three spaced receiving antennas and one parasitic antenna. The parasitic antenna is spaced from and mounted alongside the array. Also included is a phase detection circuit for measuring the phase difference between signals received by one of the receiving antennas with respect to the other two. This apparatus can sense phase difference and correlate it to the azimuthal position of the object.

9 Claims, 3 Drawing Figures

ELECTROMAGNETIC DETECTION APPARATUS

GOVERNMENT INTEREST

The invention described herein was made in the course of a contract with the Government and may be manufactured, used and licensed by or for the government for governmental purposes without the payment to us of any royalties thereon.

BACKGROUND OF THE INVENTION

The present invention relates to electromagnetic detection and in particular to an array of antennas used to measure phase delay and determine the angular position of an object.

It is known to use a phased antenna array to determine the angular position of a target. However, these arrays normally require rather complicated switching and phasing apparatus to properly direct the antenna beam toward the object being detected. It is also known to arrange a series of directional antennas in a circle with their patterns oriented to provide maximum sensitivity in a radially outward direction. However, this circular array of antennas typically requires complicated directional antennas, such as horn antennas, and commutation of these antennas to determine the azimuthal position of a target. Furthermore, the foregoing approaches require a large number of antennas to provide adequate resolution of the azimuthal position of a target.

SUMMARY OF THE INVENTION

In accordance with the illustrative embodiment demonstrating features and advantages of the present invention there is provided an electromagnetic detection apparatus for sensing an object. This apparatus has a transmission means for radiating electromagnetic energy toward this object. Also included is an array of at least three spaced receiving antennas and a parasitic antenna spaced from and mounted alongside this array. The apparatus also includes a phase detection means for measuring the phase difference between signals received by a given one of said antennas and the other ones of said receiving antennas. Thus the phase difference varies with the angular position of the object.

By employing the foregoing apparatus a relatively simple device is provided which can determine the angular position of an object simply by measuring the phase difference between one antenna with respect to the other two. The measurement, being made with one parasitic and three receiving antennas, is relatively simple. Furthermore, the measurement does not require complicated switching or variable phase shifting elements to determine the angular position of the object. Preferably, each of the antennas has an omni-directional pattern so that the returns from an object are continually sensed without regard to the azimuthal position of the object. Use of such omni-directional apparatus allows the building of a simple, reliable and compact detection apparatus.

In a preferred embodiment of the present invention a swept frequency is transmitted and compared to the returns from an object to determine the range of that object. Preferably a mixer is employed to obtain the difference frequency between the transmitted and received signal to produce a constant frequency signal whose frequency is a measure of range.

It is also preferred that an automatic frequency control circuit be employed to further shift the frequency of the outputs of the mixers toward a predetermined center frequency. This frequency shifting allows the convenient use of bandpass filters which exclude extraneous target returns and noise. In addition, a control signal developed by the automatic frequency control circuit has a magnitude that corresponds to the range of the detected oject.

The preferred structure of the transmitting and receiving antennas is in the form of a pair of spaced coaxial circular plates wherein the transmitting antenna is a monopole mounted on one plate projecting perpendicularly toward the other plate. This other plate has four parallel monopoles mounted on the side most removed from the transmitting antenna. These four monopoles are arranged as the corners of a square. The side of this square is dimensioned to be one quarter of the wave length of the transmission frequency. Being arranged in this fashion, the phase difference between the respective receiving antennas is a direct measure of the angular position of the object. Furthermore, in embodiments where the circular plates are metallic, the transmitting antenna is shielded from the receiving antennas so that they are not disturbed by the high power transmission signal.

BRIEF DESCRIPTION OF THE DRAWING

The above brief description as well as other objects, features and advantages of the present invention will be more fully appreciated by reference to the following detailed description of a presently preferred but nonetheless illustrative embodiment in accordance with the present invention when taken in conjunction with the accompanying drawings wherein.

DETAILED DESCRIPTION OF THE PREFERRED EMBODIMENT

Figure 1:
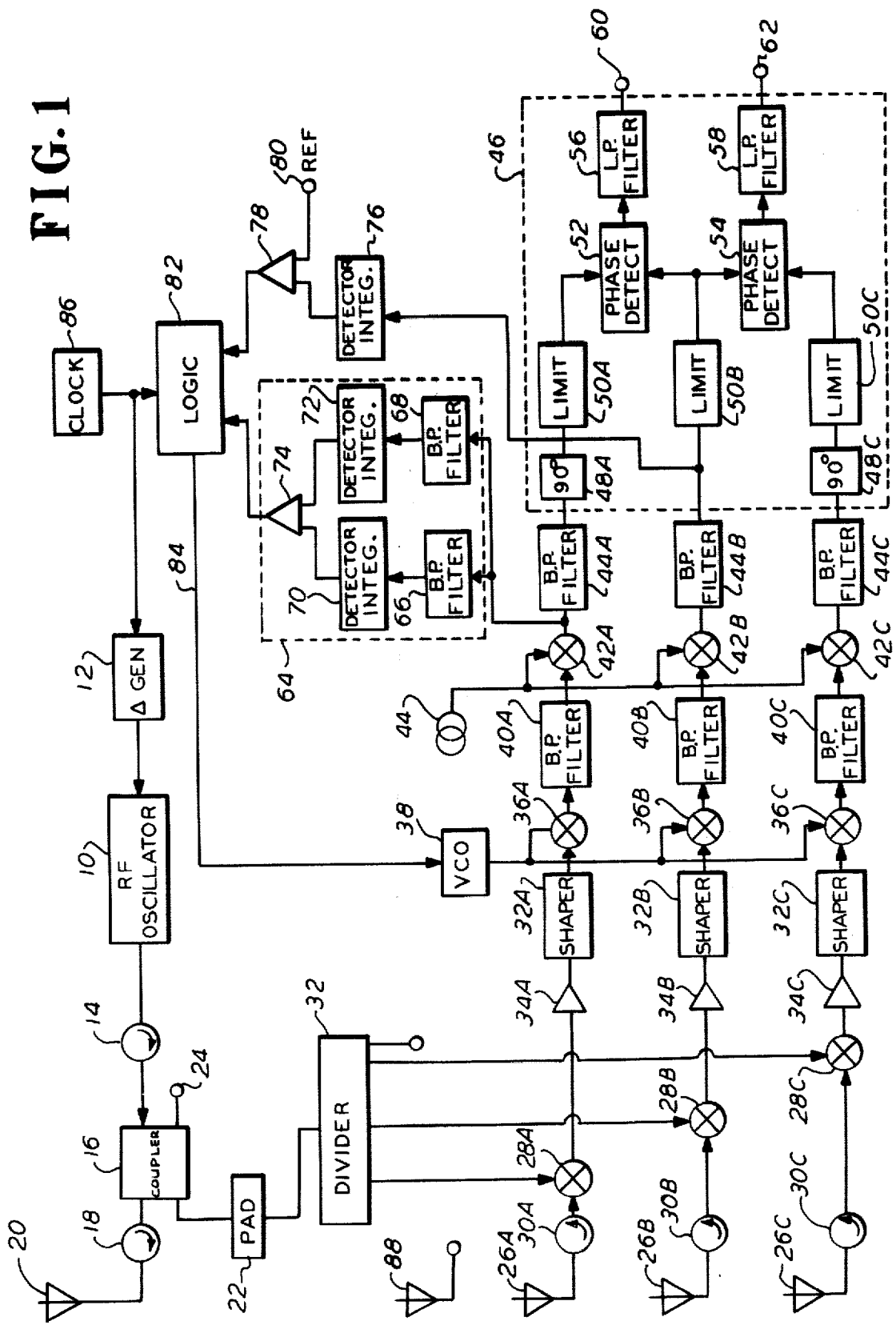
FIG. 1 is a block diagram of an electromagnetic detection apparatus according to the present invention.

Referring to FIG. 1, a transmission means is shown herein as swept radio frequency oscillator 10 which is swept in response to triangular waveform generator 12. It is appreciated that swept frequency techniques are well known in the art and need not be specifically described herein. The outputs of oscillator 10 is coupled through isolater 14 to 90° hybrid coupler 16. Coupler 16 produces an output which is coupled through isolator 18 to transmitting antenna 20, which antenna will be described subsequently in further detail. Another output of coupler 16, which is shifted 90°, is applied to attenuator pad 22. The third output 24 of coupler 16 is not used.

It should be noted here that in order to provide for optimal feedthrough nulling the radio frequency (RF) path length from isolator 14 through coupler 16, isolator 18, antenna 20 to antennas 26A–26C, and through isolators 30A–30C to mixers 28A–28C is made equal, except for the 90 degree phase shift through coupler 16, to the RF path length from isolator 14 through coupler 16, through cabling (not shown) as needed, through pad 22, and through divider 32 to mixers 28A–28C. This arrangement provides for optimal feedthrough nulling or cancellation of the RF leakage (spillover) from the transmit antenna 20 to the receive antennas 26A-26C.

An array of three spaced receiving antennas is shown schematically herein as antennas 26A, 26B and 26C and will be described structurally in further detail hereinafter. Mixers 28A-28C are generally referred to herein as a mixing means which, in this embodiment, operates to reduce the output frequency of the isolators 30A-30C an amount equal to the output frequency of divider 32. Antennas 26A-26C are coupled to mixers 28A-28C, respectively through isolators 30A-30C, respectively. Divider 32 is a conventional four-way power divider which receives the output of attenuator 22 and produces four equal output signals. Three of these outputs are connected to a different input of mixers 28A-28C. The outputs of mixers 28A-28C are coupled through pre-amplifiers 34A-34C, respectively, to a high pass filter means which is shown herein as shapers 32A-32C, respectively. Shapers 32A-32C are high pass filters which correct the received signal for the signal loss occurring because of the path traveled by the signal. Essentially, the shaper corrects the incoming signal by multiplying it by a factor $R^{-4}$ whereby R constitutes the one-way path length (target range) of the radiated signal. Shapers 32A-32C perform this correction by employing a high pass filter which rolls off at 12 dB/octave. As explained further hereinafter, the input frequency is proportional to range (R) to allow such range correction. The outputs of shapers 32A-32C are coupled to one of the inputs of mixers 36A-36C, respectively. The other inputs of mixers 36A-36C are commonly connected to the output of voltage controlled oscillator 38. The outputs of mixers 36A-36C are coupled to the inputs of bandpass filters 40A-40C, respectively, which in a constructed embodiment, were three identical bandpass filters having passbands of 91 to 99 kHz (kiloHertz). The outputs of filters 40A-40C are separately connected to one of the inputs of mixers 42A-42C, respectively. Mixers 42A-42C are referred to as a frequency conversion means. The other inputs of mixers 42A-42C are commonly connected to the output of fixed frequency oscillator 44 which supplies an 87.5 kHz signal in the constructed embodiment. Mixers 42A-42C act to decrease the frequency of the outputs of filters 40A-40C by 87.5 kHz using well known circuitry. The outputs of mixers 42A-42C are connected to the inputs of bandpass filters 44A-44C, respectively, which in the constructed embodiment, were three identical bandpass filters having a passband of 7.25 to 8.75 kHz.

A phase detection means is shown herein as subcircuit 46, which is driven by the outputs of filters 44A-44C. In this embodiment the phase detection means comprises two 90° phase shifters 48A and 48C which are driven by the outputs of bandpass filters 44A and 44C, respectively. Also included are limiters 50A-50C which produce synchronous square wave outputs. Limiters 50A and 50C are driven by the outputs of phase shifters 48A and 48C, respectively. Limiter 50B is driven by the output of bandpass filter 44B. Quadrature phase detectors 52 and 54 each have one of their comparison inputs commonly connected to the output of limiter 50B. The other comparison inputs of detectors 52 and 54 are separately connected to the outputs of limiters 50A and 50C, respectively. The outputs of detectors 52 and 54 are coupled through low pass filters 56 and 58 to output terminals 60 and 62, respectively.

A frequency sensing means is shown herein as subcircuit 64. Subcircuit 64 includes a pair of bandpass filters 66 and 68 whose passbands are 6.5-8.0 kHz and 8.0-9.5 kHz, respectively. The ouputs of filters 66 and 68 are coupled to detector integrators 70 and 72, respectively. Detector integrators 70 and 72 each comprise a diode detector which feeds a well known capacitive integrator to produce a direct current signal that is proportional to the integral of the magnitude of its input. The outputs of detector integrators 70 and 72 are separately connected to different inputs of a differential means shown herein as differential amplifier 74.

Detector integrator 76 is shown with its input connected to the output of bandpass filter 44B. Detector integrator 76 is constructed identically to the previously described detector integrators 70 and 72. The output of detector integrator 76 is connected to one input of comparator 78. The other input of comparator 78 is connected to a terminal 80 which is kept at a reference potential. The outputs of devices 74 and 78 are connected to a logic circuit 82. This logic circuit is involved in selecting the specific target which is to be monitored by the system of FIG. 1. This logic circuit 82 may take many forms. However, in this embodiment, circuit 82 selects the largest signal appearing from comparator 78 during a cycle of generator 12. Thereafter, logic circuit 82 produces an output on line 84 which when applied to voltage controlled oscillator 38, causes in effect the system to lock onto the range of the selected target in a manner which will be more fully described hereinafter. Essentially, logic circuit 82 tends to change the output voltage on line 84 to produce a null signal at the output of amplifier 74. Thus, logic circuit 82 contains well known elements of an auomatic frequency control loop. The synchronism between logic circuit 82 and triangle generator 12 is maintained by clock 86 which is connected to both of the foregoing elements.

A parasitic antenna 88 is also illustrated herein but is shown unconnected since it shapes the antenna pattern but does not provide an input to the system.

Figure 2:
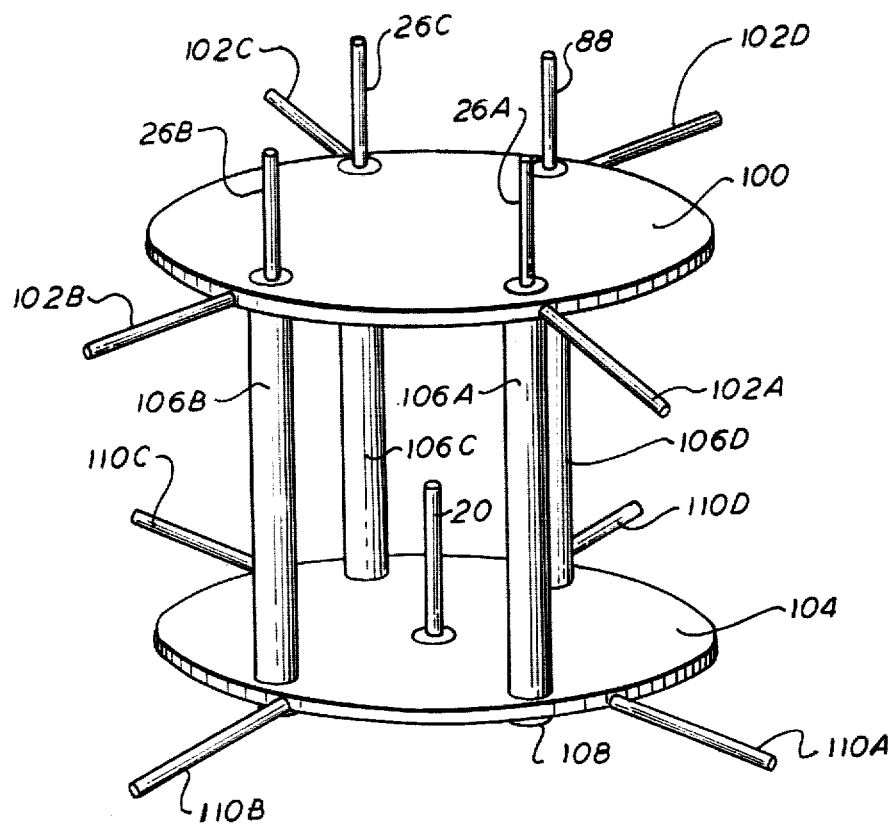
FIG. 2 is a perspective view of the transmission and receiving antennas of FIG. 1.

Referring to FIG. 2, the previously mentioned transmission, parasitic and receiving antennas are shown in a perspective view. The array of three receiving antennas is shown herein as three 2.11 inch monopoles 26A-26C, which are perpendicularly mounted on circular, upper conductive plate 100. Also perpendicularly mounted on plate 100 is similar parasitic antenna 88. The antennas 26A, 26B, 26C and 88 are arranged as the four corners of a square whose side is one quarter of the average wavelength of the transmitted signal. An upper plurality of spaced, coplanar, conductive arms are shown herein as metal projection 102A-102D which extend radially outward from disc 100 at 90° intervals and which are arranged to increase the effective surface area of plate 100 so that it more closely approximates an infinite conducting plane. Upper plate 100 is connected to lower conductive plate 104 by means of upstanding struts shown as four hollow rods 106A-106D. These rods contain cabling which interconnects antennas 26A-26C to connectors on the underside of plate 104, one of which, connector 108, is partially illustrated herein. Plate 104 also has a lower plurality of spaced, coplanar, conductive arms shown herein as metal porjections 110A-110D which extend radially outward from the edge of plate 104 at regular 90° intervals. It is also to be appreciated that a connector (not shown) is also mounted on the underside of plate 104 to allow connection to transmit antenna 20.

Figure 3:
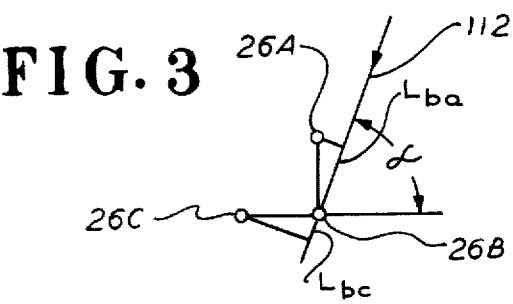
FIG. 3 is a diagram illustrating phase delays for the receiving antennas of FIG. 2.

To facilitate an understanding of the phase relationships that exist for signals received by the receive antennas of FIG. 2, a diagram is given in FIG. 3 showing the relevant geometries. This Figure is a plan view showing antennas 26A-26C and an assumed return signal arriving along path 112 at an angle $\alpha$ with respect to the base line defined as the linear extension between antennas 26B and 26C. It is also to be understood that the object being sensed is sufficiently distant from the receiving antennas that the returns from that object arrive essentially as a plane wave so that the rays of the return signal can be treated as a series of parallel lines. This being the case, the effective differential path length between antennas 26B and 26A is the length $L_{ba}$, the illustrated projection from antenna 26A being perpendicular to ray 112. Similarly, the effective differential path length between antennas 26B and 26C is length $L_{bc}$. Again the projection from antenna 26C is perpendicular to ray 112. In FIG. 3 the two illustrated right triangles are identical since their hypotenuses are two adjacent sides of the square formed by the receiving antennas and since the smallest angle of each is the compliment of $\alpha$. Since the phase difference along a given interval of ray 112 is equal to $2\pi$ times the ratio of the length of that interval to the wave length; the angle $\alpha$ and the inter-antenna phase difference can be related as follows:

$$\sin \alpha = -\frac{\phi_{ba}\lambda}{2\pi (\lambda/4)} = -\frac{2\phi_{ba}}{\pi}$$

$$\cos \alpha = \frac{\phi_{bc}\lambda}{2\pi (\lambda/4)} = \frac{2\phi_{bc}}{\pi}$$

wherein $\lambda$ is the wavelength along ray 112 and $\phi_{ba}$ and $100_{bc}$ are the phase differences between antenna 26B to antennas 26A and 26C, respectively. It is to be noted that a negative sign appears in the above equation since the phase difference between antenna 26B with respect to antenna 26A will be negative. By performing the above analysis for the other quadrants in which the ray 112 can be received, it can be verified that the foregoing equations apply to all four quadrants. As is well understood in the art, obtaining the sine and cosine of an azimuthal angle $\alpha$ yields quantities which can be applied to the vertical and horizontal deflection plates of a cathode ray tube to deflect a cathode ray at an angle equal to that azimuthal angle.

To facilitate an understanding of the operation of the apparatus of FIGS. 1 and 2, its operation will be now briefly described. Clock 86 (FIG. 1) generates a pulse train which times the triangular generator 12. Generator 12 applies to the modulating input of oscillator 10 a signal which alternately ramps upwardly and downwardly at a fixed rate. The repetition rate of generator 12 is chosen in view of the expected range of targets together with the smallest frequency difference which can be readily resolved by the equipment, as is well understood in the art. The output of oscillator 10 is applied to coupler 16 through isolator 14. Coupler 16 trasmits the bulk of its input power to transmit antenna 20 through isolator 18. A portion of the energy applied to coupler 16 is coupled to four-way divider 32 through attenuator 22. The time required for a signal to be transmitted from antenna 20, reflected from an object and returned to receive antennas 26A-26C is equal to the round trip distance divided by the speed of light. Because of this transit time and because the transmitted frequency is swept, the transmitted and received signals have a frequency difference proportional to the range of the target, as is well understood in the art. Since the transmitted and received signals are coupled to mixers 28A-28C, the frequency difference between received and transmitted signals is generated at the output of these mixers. Accordingly, the swept signals appearing at the inputs of mixers 28A-28C are converted into constant frequency signals (except around the time where the sweeping frequency changes direction). Since the received amplitude is inversely proportional to the fourth power of the range of the object, shapers 32A-32C are used to attenuate relatively near (small frequency difference) returns to a greater extent than distant returns. As is known in the art, such shaping can be provided by a high pass filter which rolls off at 12 db/octave. Therefore, the outputs of shapers 32A-32C are signals having a relatively constant frequency and amplitude (subject, of course, to variations in target speed and cross-section).

As previously mentioned, the frequency of signals from shapers 32A-32C is a measure of the range of the target. Accordingly, a mechanism for determining this frequency is provided by a voltage controlled oscillator. This oscillator 38 applies to one input of each of mixers 36A-36C a frequency which causes the mixers to shift the outputs of shapers 32A-32C to the spectral center of bandpass filters 40A-40C. The manner in which voltage controlled oscillator 38 derives this proper frequency is as follows: The outputs of bandpass filters 40A-40C are shifted down in frequency by 87.5 kHz (the output frequency of local oscillator 44) through mixers 42A-42C. The output of mixer 42A is coupled to the two bandpass filters 66 and 68. These two filters have passbands which are contiguous at 8 kHz. Accordingly, the magnitude of output of one of these filters will be greater depending upon whether their common inputs are above or below 8 kHz. The outputs of filters 66 and 68 are detected and integrated by circuits 70 and 72 and fed separately to the differential inputs of differential amplifier 74. Amplifier 74 therefore produces a signal whose polarity is an indication whether the output of mixer 42A is greater or less than 8 kHz. The output of amplifier 74 is therefore an error signal which is applied through logic means 82 to control the frequency of voltage controlled oscillator 38. The foregoing is a closed loop wherein the frequency of oscillator 38 is controlled to produce nominally 95.5 kHz from the output of mixers 36A-36C and nominally 8 kHz from the outputs of mixers 42A-42C. Moreover, if the voltage/frequency characteristic of oscillator 38 is linear the magnitude of voltage on line 84 is a quantity proportional to the range of the target. If this transfer characteristic is nonlinear then well known correction circuits can convert this nonlinear quantity into a quantity proportional to range.

The outputs of mixers 42A-42C are further filtered by bandpass filters 44A-44C before being applied to phase detection network 46. The phase detectors 52 and 54 are well known quadrature phase detectors. Accordingly, a 90° phase shifter is inserted in one of the inputs of each phase detector. In addition, the input signals to detectors 52 and 54 are limited by limiters 50A-50C to produce the usual signal which is like a square wave. Consequently, the outputs of phase detectors 52 and 54 are signals which are proportional to the sine and cosine, repectively, of the angle $\alpha$ (FIG 3). These signals are passed through low pass filters 56 and 58 to remove high frequency transients and produce direct current signals on terminals 60 and 62 which may be coupled to a display terminal or telemetry equipment (not shown).

It is to be appreciated that various modifications may be implemented with respect to the above described preferred embodiment. For example, various mounting structures may be provided for the receiving and transmitting antennas. In an aircraft where the foregoing equipment is adapted to determine the pitch of the aircraft with respect to ground, the receiving antennas may be mounted on the right side of the aircraft with the transmit antenna on the left. Such mounting effectively shields the receiving antennas from the transmit antenna. Furthermore, it is anticipated that the receiving antennas may be spaced for some embodiments at multiples of one-quarter wave length. In addition, where range is unimportant, the swept frequency of the transmit circuit may be replaced with a fixed frequency. In that case, the various mixers and automatic frequency control circuits may be excluded. Also, since there are many known circuits for measuring phase difference, it is expected that for some embodiments these other well known phase measuring circuits may be substituted. Of course, the frequency at which the foregoing system operates and the corresponding passbands of various filters can be changed to other operating frequencies. Furthermore, while monopole antennas are illustrated herein, it is anticipated that various other directional or omni-directional antennas may be substituted. In addition, other routine circuit changes are anticipated to accomodate different power ratings, frequencies, accuracies etc. Furthermore, different materials may be substituted in the antenna structure to provide the desired conductivity, frequency, range, power, isolation etc.

Obviously, many other modifications and variations of the present invention are possible in light of the above teachings. It is therefore to be understood that within the scope of the appended claims, the invention may be practiced otherwise than as specifically described herein.

We claim:

1. Electromagnetic detection apparatus for sensing an object, comprising:

transmission means for radiating electromagnetic energy toward said object around a given transmission frequency and with a swept frequency;

an array of at least three spaced receiving antennas wherein each of the antennas of said array is spaced from the nearest other one of said antennas by a distance corresponding to about one-quarter of the wavelength of said transmision frequencey;

a parasitic antenna spaced from and mounted alongside said array, wherein said receiving and parasitic antennas are arranged as the four corners of a square;

mixing means responsive to said array for reducing its recieved signals in frequency by an amount corresponding to the frequency being radiated by said transmission means, whereby swept returns from an object are converted to a constant frequency that is a function of the range of said object;

phase detection means for measuring the phase difference between signals received by a given one of said receiving antennas and the other ones of said receiving antennas, whereby said phase difference varies with the angular position of said object;

a controlled oscillator having a control input for producing a local signal at a frequency bearing a predetermined relation to the signal applied to said control input; and frequency conversion means for changing the frequency of the output of said mixing means by an amount corresponding to the frequency of said local signal.

2. Electromagnetic detection apparatus according to claim 1 further comprising:

a frequency sensing means driven by said conversion means for producing a signal indicative of whether the output frequency of said conversion means exceeds a predetermined magnitude, said sensing means driving said control input.

3. Electromagnetic detection apparatus according to claim 2 wherein said sensing means comprises:

a pair of filters having contiguous passbands; and differential means for producing a differential signal that is a function of the difference in magnitude of the outputs of said pair of filters, said differential signal being applied to said control input of said conrolled oscillator.

4. Electromagnetic detection apparatus according to claim 1 further comprising:

an upper conductive plate, said receiving and parasitic antennas comprising four parallel monopoles perpendicularly mounted on said upper plate; and a lower conductive plate, said transmission means comprising a monopolar transmission antenna perpendicularly mounted on said lower plate.

5. Electromagnetic detection apparatus according to claim 4 wherein said upper conductive plate is sized and positioned to shield said array from said transmission antenna.

6. Electromagnetic detection apparatus according to claim 5 further comprising:

an upstanding strut mounted on said lower plate, said upper plate being mounted on said strut.

7. Electromagnetic detection apparatus according to claim 6 wherein said strut comprises:

four rods, each aligned with a corresponding one of said receiving and parasitic antennas.

8. Electromagnetic detection apparatus according to claim 7 further comprising:

an upper plurality of spaced, coplanar, conductive arms projecting outwardly from the edge of said upper plate; and a lower plurality of spaced, coplanar, conductive arms projecting outwardly from the edge of said lower plate.

9. Electromagnetic detection apparatus according to claim 1 further comprising:

high pass filter means driven by said mixing means for supplying to said phase detection means a signal that is substantially invariant in magnitude with respect to the range of the object.

* * * * *